E. R. RAYBURN.
LUBRICANT PACKING FOR JOURNAL BOXES.
APPLICATION FILED MAR. 16, 1916.
1,260,806.
Patented Mar. 26, 1918.
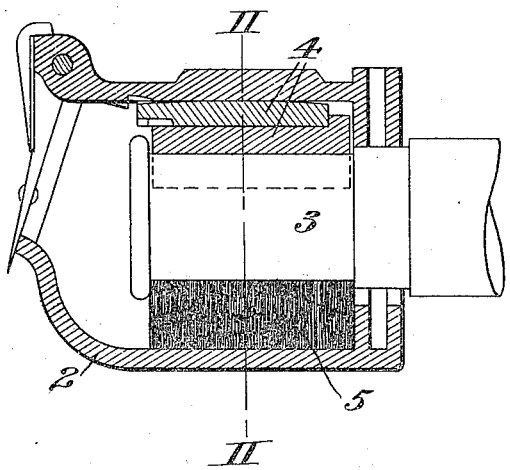
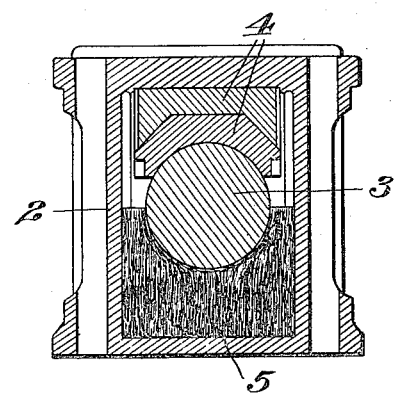
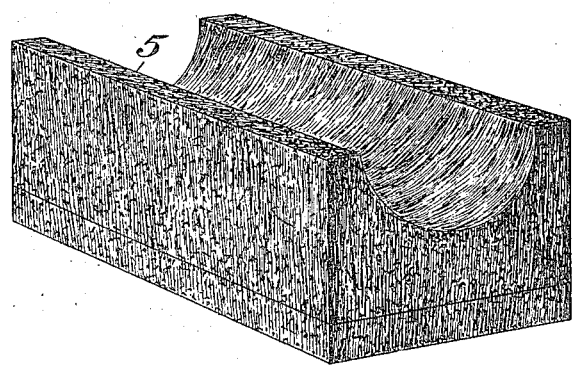
Inventor
Edmund R. Rayburn,
By William B. Corwin,
Attorney.

UNITED STATES PATENT OFFICE.

EDMUND R. RAYBURN, OF EVANSTON, ILLINOIS.

LUBRICANT-PACKING FOR JOURNAL-BOXES.

1,260,806.

Specification of Letters Patent.

Patented Mar. 26, 1918.

Application filed March 16, 1916. Serial No. 84,631.

*To all whom it may concern:*

Be it known that I, EDMUND R. RAYBURN, a citizen of the United States of America, and residing at Evanston, in the county of Cook and State of Illinois, have invented a new and useful Improvement in Lubricant-Packings for Journal-Boxes, of which the following is a specification.

The object of my invention is to provide a cheap, efficient, and convenient form of lubricant packing material for use in journal boxes, and especially the axle-boxes of railway-car axles, or for such other journals or shafting which revolve at high speeds. Such packing to be efficient must possess excellent lubricant absorbing qualities, capillarity, and elasticity, so that it will keep the journal cool while at the same time acting as an efficient and prompt conductor or vehicle of the lubricant to the surface to be oiled. The important and absolutely essential features of an efficient journal-box packing are to provide vehicles or conductors whereby the lubricant may be promptly and continuously conducted to the journal, and means associated with such lubricant conductors or vehicles whereby the same are held continuously and effiectively against the surface to be lubricated, in combination with material which renders the packing material very absorbent of the lubricant.

Heretofore journal-boxes have been packed with the ordinary wool and cotton waste, or other material in loose bulk form, which is rammed around the journal in the journal-box. And in some instances the packing has been made in the form of dense felted pads or blocks, but the use of these latter has not been attended with success, as they quickly glaze and harden on the surface and become inoperative. As a consequence the old and well known loose waste is almost universally used on railway-cars. The disadvantages attending the use of this form of packing are matters of such common knowledge as hardly to require repetition here.

My invention is designed to produce a packing which obviates the disadvantages of the forms of packing now in common use, and to provide a packing in commercial pad or block form which has all the advantages of the packings now employed unattended by their disadvantages.

In making my improved packing, I take animal fiber to afford capillarity, and vegetable and mineral fibers to provide absorption and furnish the necessary elasticity, in suitable proportions, and mix and entwine them thoroughly together by what may be termed a loose felting or semi-felting process. The material after such process is subjected to heat and pressure and thereby compacted into sheets which may be afterward cut into pads or blocks of the dimensions required. The material I thus obtain is in the form of what may be called a "spongy" mass, which has great absorptive properties, which permits free movement of the oil to the bearing, and which affords elasticity to overcome the effects of vibration and gravity and thereby insures expansion, so that the surface of the packing will remain up against the journal.

In the accompanying drawing, I have illustrated my improved packing pad in lubricating position in a journal-box.

In the drawings,

Figure 1 is a longitudinal vertical section of a journal-box, showing the journal or axle, with my improved pad in position; Fig. 2 is a vertical cross-section on the line II—II of Fig. 1; and Fig. 3 is a perspective view of the pad in conjunction with a supplemental piece of the same material, so as to adapt the pad for use in journal-boxes of varying dimensions.

In the drawings, 2 is the journal-box, 3 the axle, 4 the ordinary brasses, and 5 my improved packing pad constructed as hereinbefore described.

The advantages of my invention will be readily apparent. In the present method of packing journal-boxes with loose waste, the waste lacks uniformity and is not amenable to different grades of oil and services and varying climatic conditions. The waste is usually applied by unskilled and often careless workmen, who frequently do not put enough of it in the journal-boxes, or use too much. In the first instance, vibration and gravity cause the waste to settle and get out of contact with the bearing, and in the second instance the pressure caused by the excess waste causes glazing of the bearing surface of the waste and consequent stoppage of the passage of the lubricant to the bearing. My improved pad can be installed in an axle-box by the most unskilled workman much more quickly than such box could be packed with the loose waste, and its installment cannot be affected by carelessness, as its form compels the proper amount of packing to be used. My improved pad also possesses manifest advantages over what are called felt pads. A pad of this sort has proved impractical, as it is too dense to absorb and carry sufficient lubricant. The denseness also militates against capillarity as the material could not deliver the lubricant where it was required. The pads also lacking elasticity had to be made large enough to insure their remaining in contact with the journal, which naturally resulted in excessive pressure and this pressure in conjunction with the denseness and solidity of the felt quickly caused the surface to glaze over and stop the passage of the oil. My improved packing pad has the further advantage over these dense felt pads, that, by what may be termed its porous nature, dust, products worn from the bearings or generated by friction, and residue from the oil, are permitted to be borne away by gravity through the body of the pad and do not collect as in the case of the dense felt pads on the surface of the packing where it contacts with the journal.

The proportions of materials which I preferably use in making my improved packing pad are fifty per centum of animal fiber, forty-five per centum of vegetable fiber, and five per centum of mineral fiber or filament, but it will be understood that these proportions may be considerably varied to conform to different service conditions.

I claim:

1. A packing for journal-boxes consisting of a substantially homogeneous admixture of fibers in a semi-felted pad form.

2. A packing for journal boxes consisting of a substantially homogeneous admixture of animal, vegetable and mineral fibers in a semi-felted pad form.

3. A packing for journal boxes consisting of a substantially homogeneous admixture of animal, vegetable and mineral fibers in a semi-felted pad form, the animal fibers affording capillarity, the vegetable and mineral fibers absorption and elasticity.

4. A packing for journal-boxes consisting of a substantially homogeneous admixture of about fifty per centum of animal fibers, forty-five per centum of vegetable fibers, and five per centum of mineral fibers or filaments in a semi-felted form, affording a spongy mass, the animal fibers providing capillarity, the vegetable and mineral fibers absorption and elasticity.

In witness whereof I have hereunto set my hand.

EDMUND R. RAYBURN.

Copies of this patent may be obtained for five cents each, by addressing the "Commissioner of Patents, Washington, D. C."